(12) United States Patent
Pei

(10) Patent No.: US 9,002,381 B2
(45) Date of Patent: Apr. 7, 2015

(54) MEASUREMENT COMPENSATION METHOD, APPARATUS, SERVER, AND SYSTEM IN BASE STATION POSITIONING

(71) Applicant: Huawei Technologies Co., Ltd., Shenzhen (CN)

(72) Inventor: Xinxin Pei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 13/961,303

(22) Filed: Aug. 7, 2013

(65) Prior Publication Data
US 2014/0057664 A1 Feb. 27, 2014

(30) Foreign Application Priority Data

Aug. 24, 2012 (CN) .......................... 2012 1 0305261

(51) Int. Cl.
H04W 64/00 (2009.01)
G01S 5/00 (2006.01)

(52) U.S. Cl.
CPC ............... H04W 64/006 (2013.01); G01S 5/00 (2013.01); H04W 64/00 (2013.01)

(58) Field of Classification Search
USPC .................. 455/440, 450, 456.1, 456.2, 456.5
See application file for complete search history.

(56) References Cited

U.S. PATENT DOCUMENTS

2012/0182874 A1* 7/2012 Siomina et al. ............... 370/241

FOREIGN PATENT DOCUMENTS

| CN | 101902684 A | 12/2010 |
| CN | 102056222 A | 5/2011 |
| CN | 102186191 A | 9/2011 |
| WO | WO 2011/073830 A1 | 6/2011 |

* cited by examiner

Primary Examiner — Sam Bhattacharya
(74) Attorney, Agent, or Firm — Brinks Gilson & Lione

(57) ABSTRACT

Embodiments of the present invention disclose a measurement compensation method, apparatus, server, and system in base station positioning. The method includes: receiving a reference signal time difference RSTD measurement value between different base stations that is reported by a mobile terminal; acquiring an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range; and compensating the RSTD measurement value according to the RSTD measurement compensation value to obtain an RSTD compensation result. By adopting the present invention, the RSTD measurement value reported by the mobile terminal can be compensated, so as to improve the positioning precision of the mobile terminal.

16 Claims, 7 Drawing Sheets

MEASUREMENT COMPENSATION METHOD, APPARATUS, SERVER, AND SYSTEM IN BASE STATION POSITIONING

CROSS-REFERENCE TO RELATED APPLICATIONS

This application claims priority to Chinese Patent Application No. 201210305261.5, filed on Aug. 24, 2012, which is hereby incorporated by reference in its entirety.

TECHNICAL FIELD

The present invention relates to the field of communication technologies, and in particular, to a measurement compensation method, apparatus, server, and system in base station positioning.

BACKGROUND

Base station positioning technology in an LTE (Long Term Evolution, long term evolution) network is mostly implemented by means of an OTDOA (Observation Time Difference of Arrival, observation time difference of arrival) technology. In the OTDOA technology, each serving cell base station in the LTE network delivers a PRS/CRS (Position Reference Signal/Cell Specific Reference Signal, position reference signal/cell specific reference signal), and a mobile terminal to be positioned, after receiving the PRS/CRS, calculates the time of arrival of the received PRS/CRS of each base station (eNodeB) to calculate to obtain an RSTD (Reference Signal Time Difference, reference signal time difference). That is to say, the mobile terminal to be positioned obtains an RSTD measurement value and then the mobile terminal to be positioned reports the RSTD measurement value to a positioning server. However, due to serious multi-path interference existing in some serving regions in an actual network, a large deviation exists when RSTD measurement is performed by using the PRS/CRS reference signal, thereby greatly reducing the positioning precision.

In the prior art, a technology for compensating the RSTD measurement value is introduced. The mobile terminal may measure to obtain an RSTD measurement result of a cell i, and the measurement result may be reported to the positioning server through a GPS (Global Position System, global positioning system). The mobile terminal may also report a position coordinate thereof through the GPS. The positioning server obtains, according to the position coordinate of the mobile terminal, a true RSTD value corresponding to the cell i, subtracts the true RSTD value of the cell i that is reported by the mobile terminal from the RSTD measurement value of the cell i that is reported by the mobile terminal to obtain a compensation value, and compensates the RSTD measurement result within a specific region based on the obtained compensation value, so as to complete the positioning of the mobile terminal.

In the existing RSTD measurement based on the compensating technology, the mobile terminal not only needs to measure position information thereof in real time, but also needs to send a GPS signal to report its position, thereby wasting resources of the mobile terminal. Moreover, when the GPS signal of the mobile terminal is too weak to receive the GPS signal, effective RSTD measurement cannot be implemented.

SUMMARY

Embodiments of the present invention provide a measurement compensation method, apparatus, and system in base station positioning, which are capable of compensating an RSTD measurement value reported by a mobile terminal, thereby improving the positioning precision of the mobile terminal and saving a terminal resource overhead as much as possible.

In a first aspect, an embodiment of the present invention provides a measurement compensation method in base station positioning, including:

receiving a reference signal time difference RSTD measurement value between different base stations that is reported by a mobile terminal;

acquiring an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range; and compensating the RSTD measurement value according to the RSTD measurement compensation value to obtain an RSTD compensation result.

In a second aspect, an embodiment of the present invention provides a measurement compensation apparatus in base station positioning, including:

a receiving module, configured to receive an RSTD measurement value between different base stations that is reported by a mobile terminal;

an acquiring module, configured to acquire an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range; and a compensating module, configured to compensate, according to the RSTD measurement compensation value acquired by the acquiring module, the RSTD measurement value received by the receiving module to obtain an RSTD compensation result.

In a third aspect, an embodiment of the present invention provides a positioning server, including:

a transceiver, configured to receive an RSTD measurement value between different base stations that is reported by a mobile terminal; and a processor, configured to: acquire an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range; and compensate the RSTD measurement value according to the RSTD measurement compensation value to obtain an RSTD compensation result.

In a fourth aspect, an embodiment of the present invention provides a base station positioning system, including: a positioning server and a positioning aid device, where the positioning aid device is pre-deployed in a fixed position, and is configured to report an auxiliary RSTD measurement value between different base stations; and the positioning server is configured to:

receive an RSTD measurement value between the different base stations that is reported by a mobile terminal within a range corresponding to the fixed position;

calculate a difference between the auxiliary RSTD measurement value and an RSTD standard value between the different base stations of the positioning aid device, and take the difference as an RSTD measurement compensation value corresponding to the positioning aid device, where the RSTD measurement compensation value is used to compensate RSTD measurement within the range; and compensate the RSTD measurement value according to the RSTD measurement compensation value to obtain an RSTD compensation result.

Based on the above, in the embodiments of the present invention, an aid device is added in the fixed position to acquire the RSTD measurement compensation value, and when the mobile terminal needs to be positioned, the positioning server may use the RSTD measurement compensation value of the corresponding aid device to compensate the RSTD measurement value reported by the mobile terminal without requiring the mobile terminal to report additional information such as GPS information. In this way, the positioning precision of the mobile terminal can be prominently improved without increasing the mobile terminal resource overhead.

BRIEF DESCRIPTION OF DRAWING

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and persons of ordinary skill in the art may still derive other drawings from the accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention. Base station positioning mentioned in the embodiments of the present invention refers to positioning a terminal by means of a difference of the time of arrival of PRSs/CRSs sent to the mobile terminal by different base stations, that is, positioning the mobile terminal by means of an RSTD measurement value of the mobile terminal. The mobile terminal is a terminal that is movable in wireless communication, and includes various portable terminals and vehicle communication terminals.

Figure 1:
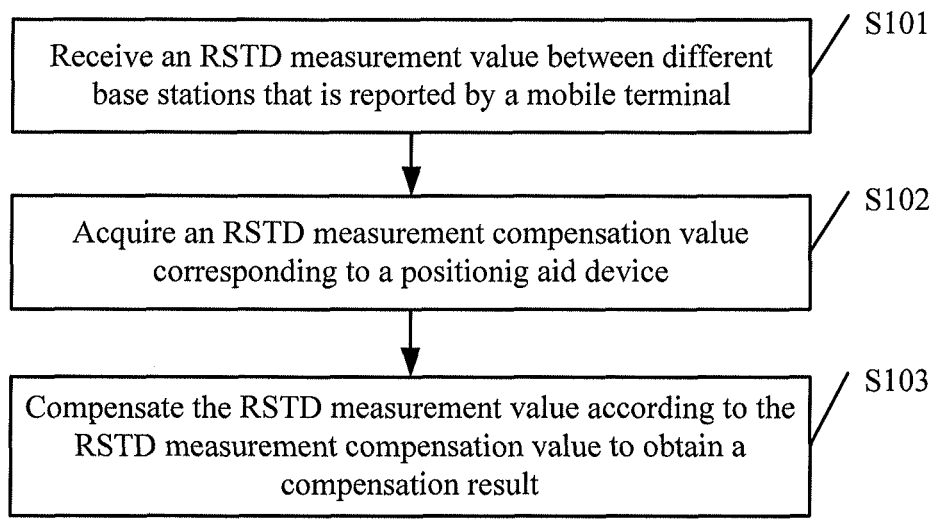
FIG. 1 is a schematic diagram of a measurement compensation method in base station positioning according to an embodiment of the present invention.

In order to improve the positioning precision, the RSTD measurement value of the mobile terminal needs to be compensated to a certain extent by a positioning server. FIG. 1 is a schematic diagram of a measurement compensation method in base station positioning according to an embodiment of the present invention, where the method includes the following steps.

S101. Receive an RSTD measurement value between different base stations that is reported by a mobile terminal.

When the mobile terminal needs to implement base station positioning, PRSs/CRSs sent by a serving cell base station where the mobile terminal resides and one or more positioning-involved base stations are received, the mobile terminal respectively calculates the time of arrival of the PRSs/CRSs delivered by the serving cell base station and each positioning-involved base station, respectively calculates a difference of the time of arrival of the PRSs/CRSs between each positioning-involved base station and the serving cell base station to obtain an RSTD measurement value between each positioning-involved base station and the serving cell base station, and reports the obtained RSTD measurement value to the positioning server.

During specific implementation, the mobile terminal may further obtain according to the PRS/CRS: measurement values such as a measurement value of the TOA (Time of Arrival, time of arrival) of the PRS/CRS between the serving cell base station and the positioning-involved base station, an RSRP (Reference Signal Receiving Power, reference signal receiving power) measurement value, an RSRQ (Reference Signal Receiving Quality, reference signal receiving quality) measurement value, and a TA (Time Advance, time advance) of the mobile terminal.

S102. Acquire an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range.

In S102, the RSTD measurement compensation value corresponding to the positioning aid device closest to the mobile terminal may be selected. The selecting the positioning aid device specifically includes: performing calculation on the RSTD measurement value to obtain a measurement position coordinate of the mobile terminal, and selecting the positioning aid device closest to the measurement position coordinate of the mobile terminal from a plurality of candidate positioning aid devices.

Alternatively, in S102, a corresponding positioning aid device may also be selected in a manner of signal matching. The selecting the positioning aid device specifically includes: respectively performing matching calculation on the RSTD measurement value and each candidate RSTD measurement value between the different base stations that is reported by each of a plurality of candidate positioning aid devices to obtain a plurality of calculation results, and selecting the positioning aid device with the calculation result satisfying a matching condition.

S103. Compensate the RSTD measurement value according to the RSTD measurement compensation value to obtain a compensation result.

A serving cell base station of the positioning aid device obtained by selecting in the manner in the above S102 and the serving cell base station of the mobile terminal are the same base station; and a positioning-involved base station that is involved in the positioning of the positioning aid device and is corresponding to the selected RSTD measurement compensation value is one-to-one corresponding to a positioning-involved base station corresponding to the RSTD measurement value reported by the mobile terminal.

A simple compensating manner in S103 is: adding an RSTD measurement value reported by a user with the selected RSTD compensation value: $RSTD'_i + \Delta t_i$, so as to obtain an accurate RSTD value of the mobile terminal, where $RSTD'_i$ is an RSTD measurement value, reported by the mobile terminal, between the $i^{th}$ positioning-involved base station and the serving cell base station where the mobile terminal is positioned, and $\Delta t_i$ is an RSTD measurement compensation value between the $i^{th}$ positioning-involved base station of the mobile terminal that is corresponding to the selected positioning aid device and the serving cell base station where the positioning aid device is positioned.

Figure 2A:
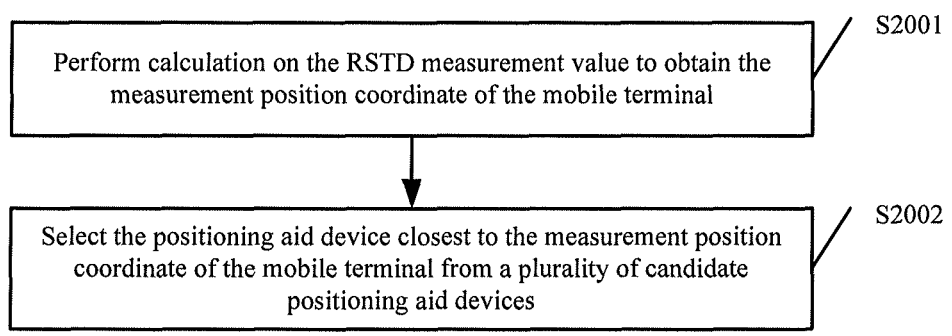
FIG. 2a is a schematic diagram of a method for selecting a positioning aid device in FIG. 1.

Further, specifically, FIG. 2a is a schematic diagram of a method for selecting a positioning aid device in FIG. 1, which further includes the following steps for determining the positioning aid device before the acquiring the RSTD measurement compensation value corresponding to the positioning aid device in the above S102:

S2001. Perform calculation on the RSTD measurement value to obtain the measurement position coordinate of the mobile terminal.

The RSTD measurement value may be calculated by means of a Taylor algorithm or some other base station positioning algorithms to obtain a coarse position of the mobile terminal.

S2002. Select the positioning aid device closest to the measurement position coordinate of the mobile terminal from a plurality of candidate positioning aid devices.

Figure 2B:
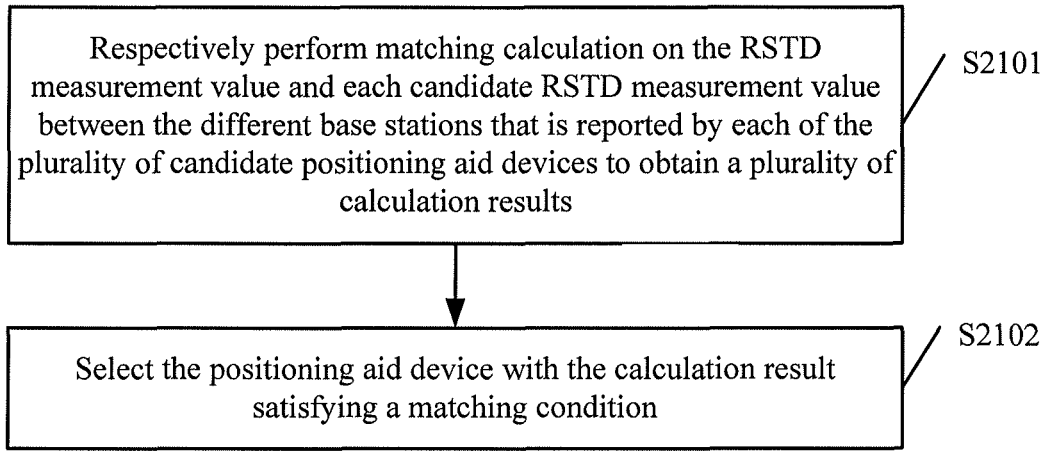
FIG. 2b is a schematic diagram of another method for selecting a positioning aid device in FIG. 1.

Further, specifically, FIG. 2b is a schematic diagram of another method for selecting a positioning aid device in FIG. 1, which further includes the following steps for determining the positioning aid device before the acquiring the RSTD measurement compensation value corresponding to the positioning aid device in S102.

S2101. Respectively perform matching calculation on the RSTD measurement value and each candidate RSTD measurement value between the different base stations that is reported by each of the plurality of candidate positioning aid devices to obtain a plurality of calculation results.

S2102. Select the positioning aid device with the calculation result satisfying a matching condition.

The matching calculation and matching condition calculation may be performed by using the following formulas:

$$\Delta TA = (TA'_E - TA'_{UE}) < \text{Threshold\_TA}; \quad \text{Formula I:}$$

where $\Delta TA$ is a time advance difference to be calculated, $TA'_{UE}$ is a time advance measured by the mobile terminal, $TA'_E$ is a time advance measured by the positioning aid device, and Threshold_TA is a preset time advance differential threshold value, and the time advance is directly obtained by the mobile terminal and the positioning aid device according to a time parameter between uplink and downlink signals thereof;

$$\Delta RSRP = (RSRP'_E - RSRP'_{UE}) < \text{Threshold\_RSRP}; \quad \text{Formula II:}$$

where $\Delta RSRP$ is a reference signal receiving power difference to be calculated, $RSRP'_{UE}$ is a reference signal receiving power value measured by the mobile terminal, $RSRP'_E$ is a reference signal receiving power value measured by the positioning aid device, and Threshold_RSRP is a preset reference signal receiving power differential threshold value;

$$\Delta RSRQ = (RSRQ'_E - RSRQ'_{UE}) < \text{Threshold\_RSRP}; \quad \text{Formula III:}$$

where $\Delta RSRQ$ is a reference signal receiving quality difference to be calculated, $RSRQ'_{UE}$ is a reference signal receiving quality value measured by the mobile terminal, $RSRQ'_E$ is a reference signal receiving quality value measured by the positioning aid device, and Threshold_RSRP is a preset reference signal receiving quality difference threshold; and $$\Delta RSTD_i = (RSTD_{iE} - RSTD_{iUE}) < \text{Threshold\_RSTD}; \quad \text{Formula IV:}$$

where the $\Delta RSTD_i$ is a difference between the reference signal time difference values of the $i^{th}$ positioning-involved base station as compared with a serving cell base station, $RSTD_{iUE}$ is a reference signal time difference value, measured by the mobile terminal, of the $i^{th}$ positioning-involved base station as compared with the serving cell base station, $RSTD_{iE}$ is a reference signal time difference value, measured by the positioning aid device, of the $i^{th}$ positioning-involved base station as compared with the serving cell base station, and Threshold_RSTD is a preset differential threshold value of the reference signal time difference value.

$TA'_E$, $RSRP'_E$, $RSRQ'_E$, and $RSTD_{iE}$ are corresponding measurement reference values of the positioning aid device. After the above four formulas are calculated, the corresponding positioning aid device with the measurement reference value satisfying one or more of the above conditions is taken as the positioning aid device configured to compensate the RSTD measurement value.

The above matching calculation and matching condition calculation may also be performed by the following formula:

$$\operatorname{argmin} T = w_1 * [TA'_E - TA'_{UE}]^2 + w_2 * [RSRP'_E - RSRP'_{UE}]^2 + w_3 * [RSRQ'_E - RSRQ'_{UE}]^2 + w_4 * \sum_i [RSTD'_{iE} - RSTD'_{UE}]^2$$

where $w_1$, $w_2$, $w_3$, and $w_4$ are preset weight values, and the formula represents: for a cost function of the TA value, RSRP value, RSRQ value, and RSTD value of the mobile terminal and each candidate positioning aid device, a measurement value corresponding to the mobile terminal remains unchanged, and after a corresponding measurement reference value of each candidate positioning aid device is substituted in the above calculation formula, the positioning aid device corresponding to the measurement reference value that obtains the minimum result thereof is taken as the positioning aid device.

It should be noted here that, the above two types of measurement value matching calculation are merely two examples in this embodiment, and in other embodiments, the measurement value matching calculation may be performed with other measurement values, which is not repeated in detail herein.

Figure 3:
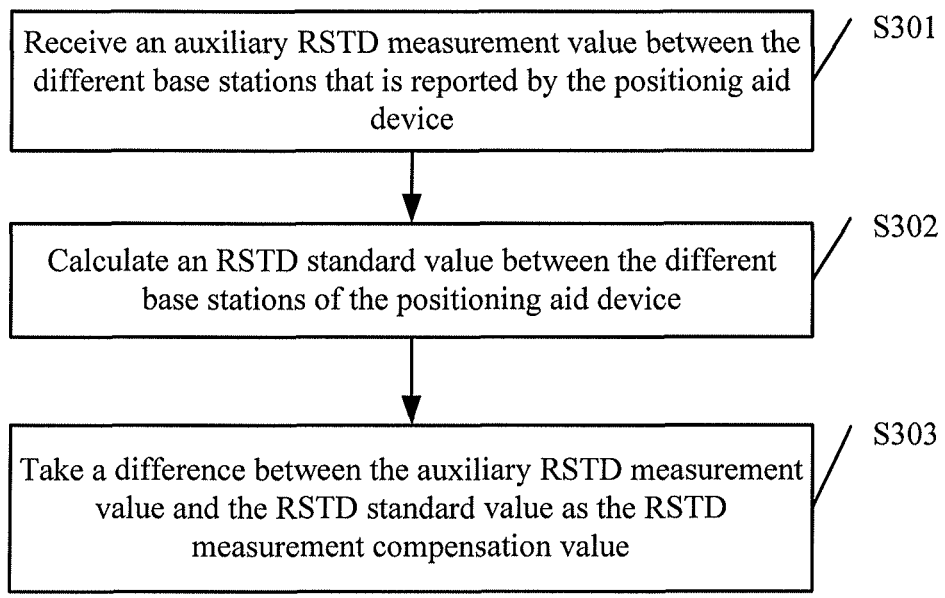
FIG. 3 is a schematic diagram of a method for acquiring an RSTD measurement compensation value in FIG. 1.

FIG. 3 is a schematic diagram of a method for acquiring an RSTD measurement compensation value in FIG. 1. An RSTD measurement compensation value within a specific region range of the positioning aid device may be acquired to compensate the RSTD measurement value of the mobile terminal. Specifically, the method includes:

S301. Receive an auxiliary RSTD measurement value between the different base stations that is reported by the positioning aid device.

In order to acquire an RSTD measurement compensation value of each small region within a range covered by a network, a plurality of positioning aid devices are set within the range covered by the network, and specifically, a positioning aid device may be set according to the multipath seriousness degree of a local network, and positioning aid devices may be densely set in serious areas.

The position of the set positioning aid device is fixed and accurately known, and the positioning aid device can complete the residing in the serving cell and receive the CRSs/PRSs of the serving cell base station thereof and the positioning-involved base station, to complete relevant CRS/PRS measurement.

The positioning aid device may periodically measure the time of arrival of each CRS/PRS, so as to obtain the RSTD measurement reference value, and report the RSTD measurement reference value to the positioning server upon completion of a measurement period.

A database may be used to manage the number and position coordinates of these positioning aid devices, and meanwhile manage the RSTD measurement compensation values corresponding to these positioning aid devices.

S302. Calculate an RSTD standard value between the different base stations of the positioning aid device.

S303. Take a difference between the auxiliary RSTD measurement value and the RSTD standard value as the RSTD measurement compensation value.

The position coordinate of the positioning aid device is known, and a position coordinate of the serving cell base station and a position coordinate of the positioning-involved base station may also be obtained directly.

Specifically, the positioning server may also calculate to obtain the RSTD standard value according to the following formula:

$$\text{Standard value RSTD}_i = (\sqrt{(x-x_i)^2+(y-y_i)^2} - \sqrt{(x-x_0)^2+(y-y_0)^2})/c$$

where $(x_0, y_0)$ is the position coordinate of the serving cell base station, $(x, y)$ is the position coordinate of the positioning aid device, $(x_i, y_i)$ is a position coordinate of the $i^{th}$ positioning-involved base station, and c is speed of light.

After obtaining by calculation the RSTD standard value, the positioning server, according to the received RSTD measurement reference value reported by the positioning aid device in S301, may calculate to obtain the RSTD compensation value $\Delta t_i$ between the serving cell base station and the $i^{th}$ positioning-involved base station in a region corresponding to the position where the positioning aid device is positioned, and the specific calculation formula is: $\Delta t_i = \text{RSTD}_i - \text{RSTD}'_i$, where $\text{RSTD}_i$ is the standard value obtained by the above calculation, and $\text{RSTD}'_i$ is the measurement value acquired in S301.

Certainly, the embodiment corresponding to FIG. 3 is not an action that is definitely executed by the positioning server. The positioning aid device may be fixed at a specific position and remains unchanged. The RSTD measurement compensation value corresponding to the positioning aid device may be pre-stored in a memory of the positioning server. For example, a plurality of positioning aid devices have a fixed position relative to the positioning server, so the memory of the positioning server may store a list, the list including the RSTD measurement compensation value corresponding to each positioning aid device. The positioning server may read the list in the memory before or during the positioning process to obtain the RSTD measurement compensation value corresponding to any one of the positioning aid devices.

It can be known from the descriptions of the above embodiment, the present invention has the following beneficial effects.

Based on the above, in the embodiment of the present invention, an aid device is added in the fixed position to acquire the RSTD measurement compensation value, and when the mobile terminal needs to be positioned, the positioning server may use an RSTD measurement compensation value of a corresponding aid device to compensate the RSTD measurement value reported by the mobile terminal without requiring the mobile terminal to report additional information such as GPS information. In this way, the positioning precision of the mobile terminal can be prominently improved without increasing the mobile terminal resource overhead.

Figure 4:
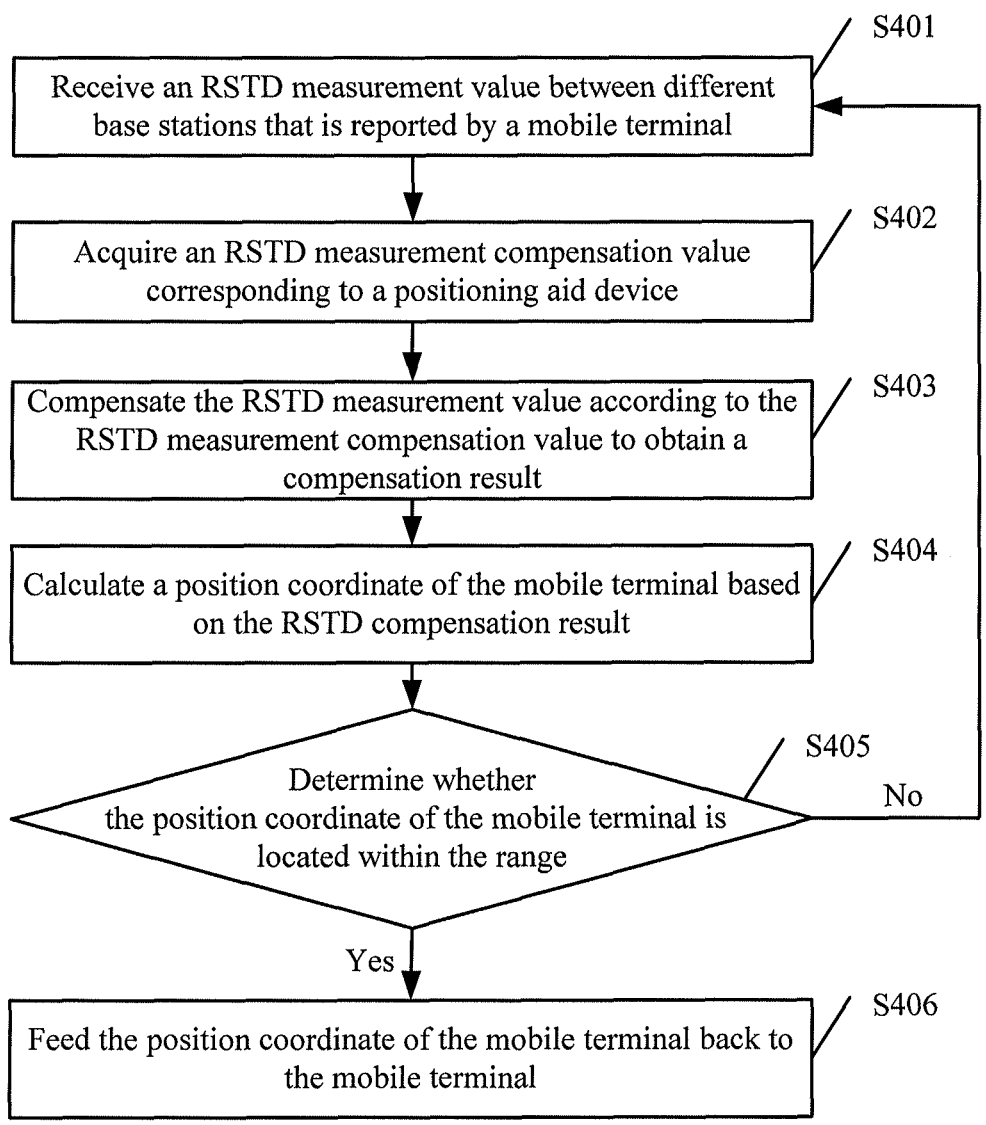
FIG. 4 is a schematic diagram of another measurement compensation method in base station positioning according to an embodiment of the present invention.

Further, FIG. 4 is a schematic diagram of another measurement compensation method in base station positioning according to an embodiment of the present invention. This embodiment differs from the embodiment corresponding to FIG. 1 in that, after compensating, according to the selected RSTD measurement compensation value, the received RSTD measurement value reported by the mobile terminal, a verifying step needs to be further executed. Specifically, this embodiment includes the following steps:

S401. Receive an RSTD measurement value between different base stations that is reported by a mobile terminal.

S402. Acquire an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range.

Likewise, as described above, the RSTD compensation value of the positioning aid device closest to the mobile terminal may be selected; or the positioning aid device satisfying a matching condition may be selected according to a measurement value matching calculation.

A serving cell base station of the positioning aid device obtained by selecting and a serving cell base station of the mobile terminal are the same base station; and a positioning-involved base station that is involved in the positioning of the positioning aid device and is corresponding to a selected RSTD measurement compensation value is one-to-one corresponding to a positioning-involved base station corresponding to the RSTD measurement value reported by the mobile terminal.

S403. Compensate the RSTD measurement value according to the RSTD measurement compensation value to obtain a compensation result.

S404. Calculate a position coordinate of the mobile terminal based on the RSTD compensation result.

According to the compensated RSTD value, an existing Taylor algorithm is adopted to obtain a more accurate position coordinate of the mobile terminal.

S405. Determine whether the position coordinate of the mobile terminal is positioned within the range.

The position coordinate of the mobile terminal is obtained, the position coordinate of the mobile terminal is compared with the position of the selected positioning aid device, and when it is determined that the position coordinate of the mobile terminal is positioned within the range, the position coordinate of the mobile terminal that is obtained in this calculation is correct, and S406 is performed; otherwise, the calculation is incorrect. The range covered by the positioning aid device needs to be determined according to a specific precision requirement. The smaller the range covered by each positioning aid device is, the more accurate the obtained RSTD compensation value becomes, and finally a more accurate position coordinate of the mobile terminal is obtained.

S406. Feed the position coordinate of the mobile terminal back to the mobile terminal.

Otherwise, the position coordinate obtained by this calculation is discarded. Next compensation on the RSTD measurement value of the mobile terminal is further executed and the position coordinate thereof is calculated.

It can be known from the descriptions of the above embodiment, the present invention has the following beneficial effects.

In the embodiment of the present invention, an aid device is added in the fixed position to acquire the RSTD measurement compensation value, and when the mobile terminal needs to be positioned, the positioning server may use an RSTD measurement compensation value of a corresponding aid device to compensate the RSTD measurement value reported by the mobile terminal without requiring the mobile terminal to report additional information such as GPS information. In this way, the positioning precision of the mobile terminal can be prominently improved without increasing the mobile terminal resource overhead.

Furthermore, after the position coordinate of the mobile terminal is obtained by calculation, the position coordinate of the mobile terminal is further verified according to the position of the selected positioning aid device, thereby further ensuring the positioning accuracy of the mobile terminal.

Hereinafter, a base station positioning system and a measurement compensation apparatus in base station positioning according to an embodiment of the present invention are illustrated in detail.

Figure 5:
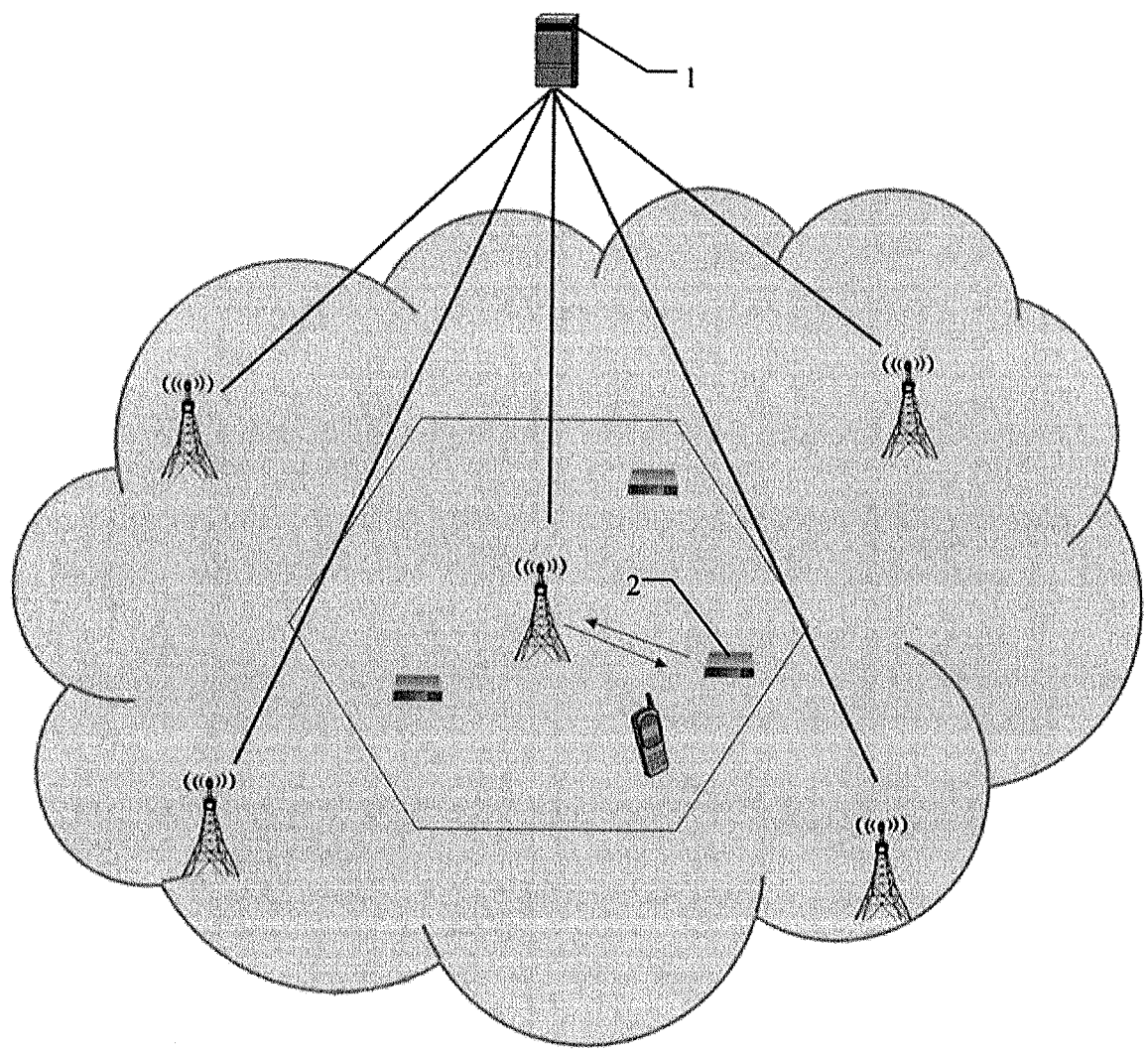
FIG. 5 is a schematic diagram of a base station positioning system according to an embodiment of the present invention.

FIG. 5 is a schematic diagram of a base station positioning system according to an embodiment of the present invention. The system according to the embodiment of the present invention is configured to compensate an RSTD measurement value for a mobile terminal within a coverage range thereof to perform accurate positioning. The base station positioning system in this embodiment includes: a positioning server 1 and a plurality of positioning aid devices, and a positioning aid device 2 is used for illustration in this embodiment. Certainly, in actual applications, the system may include only one positioning aid device, that is, the positioning server 1 only serves in a fixed region to directly acquire an RSTD measurement compensation value corresponding to the positioning aid device to perform positioning compensation.

The positioning aid device 2 is pre-deployed in a fixed position, and is configured to report an auxiliary RSTD measurement value between different base stations.

The positioning server 1 is configured to:

receive an RSTD measurement value between the different base stations that is reported by a mobile terminal within a range corresponding to the fixed position;

calculate a difference between the auxiliary RSTD measurement value and an RSTD standard value between the different base stations of the positioning aid device, and take the difference as an RSTD measurement compensation value corresponding to the positioning aid device, where the RSTD measurement compensation value is used to compensate RSTD measurement within the range; and compensate the RSTD measurement value according to the RSTD measurement compensation value to obtain an RSTD compensation result.

The positioning server 1 may be set in a base station, and calculates, according to a position coordinate of the positioning aid device 2 and an RSTD measurement reference value reported by the positioning aid device 2 to obtain an RSTD measurement compensation value within a range corresponding to the position coordinate of the positioning aid device 2.

The positioning server 1 further compensates the RSTD measurement value reported by the mobile terminal according to the RSTD measurement compensation value obtained by calculation, so as to calculate a position coordinate of the mobile terminal.

When the mobile terminal needs to implement base station positioning, PRSs/CRSs sent by a serving cell base station where the mobile terminal resides and one or more positioning-involved base stations are received, the mobile terminal respectively calculates the time of arrival of the PRS/CRS delivered by the serving cell base station and each positioning-involved base station, respectively calculates a difference of the time of arrival of the PRSs/CRSs between each positioning-involved base station and the serving cell base station to obtain an RSTD measurement value between each positioning-involved base station and the serving cell base station, and reports the obtained RSTD measurement value to the positioning server 1.

Each positioning aid device in the system can complete the residing in the serving cell, and receive the CRS/PRS of a serving cell base station thereof and the positioning-involved base station, so as to complete relevant CRS/PRS measurement. The positioning aid device may periodically measure the time of arrival of each CRS/PRS, so as to obtain the RSTD measurement reference value, and report the RSTD measurement reference value to the positioning server 1 upon completion of a measurement period, so that the positioning server 1 calculates an RSTD measurement compensation value within a region corresponding to the position where each positioning aid device is positioned.

The positioning server 1 specifically calculates the position coordinate of the positioning aid device 2, a position coordinate of the serving cell base station, and a position coordinate of the positioning-involved base station according to the received RSTD measurement reference value reported by the positioning aid device 2, so as to obtain the RSTD standard value of the positioning aid device 2 between the serving cell base station and the positioning-involved base station; and performs calculation on the RSTD measurement reference value and the RSTD standard value, so as to obtain the RSTD measurement compensation value of the positioning aid device 2 between the serving cell base station and the positioning-involved base station.

The position coordinate of the positioning aid device is known, and the position coordinate of the serving cell base station and the position coordinate of the positioning-involved base station are fixed and known, which may be obtained directly by the positioning server 1.

Specifically, the positioning server 1 may calculate to obtain the RSTD standard value according to the following formula:

$$\text{Standard value RSTD}_i = (\sqrt{(x-x_i)^2 + (y-y_i)^2} - \sqrt{(x-x_0)^2 + (y-y_0)^2})/c$$

where $(x_0, y_0)$ is the position coordinate of the serving cell base station, $(x, y)$ is the position coordinate of the positioning aid device, $(x_i, y_i)$ is a position coordinate of the $i^{th}$ positioning-involved base station, and c is speed of light.

After obtaining by calculation the RSTD standard value, the positioning server 1, according to the received RSTD measurement reference value reported by the positioning aid device 2, may calculate to obtain the RSTD compensation value $\Delta t_i$ between the serving cell base station and the $i^{th}$ positioning-involved base station in the region corresponding to the position where the positioning aid device 2 is positioned, and the specific formula is: $\Delta t_i = RSTD_i - RSTD'_i$, where $RSTD_i$ is the standard value obtained by the above calculation, and $RSTD'_i$ is the acquired measurement reference value of the positioning aid device 2.

The positioning server 1, after obtaining an RSTD measurement compensation value of each region, may store an identifier of each positioning aid device and the corresponding RSTD measurement compensation value by means of a mapping table or a database, and update timely according to requirements. Thereby, when the mobile terminal within the coverage range needs to be positioned, the positioning server 1 may search for the positioning aid device closest to the mobile terminal or the positioning aid device matching with measurement information reported by the mobile terminal and the RSTD measurement compensation value thereof, thereby implementing the compensation on the RSTD measurement value of the mobile terminal. The positioning server 1 may also actively acquire the RSTD measurement reference value of the corresponding positioning aid device when receiving the RSTD measurement value of the mobile terminal, so as to calculate the RSTD compensation value for compensating the RSTD measurement value of the mobile terminal.

When the mobile terminal needs to be positioned, the positioning server 1 specifically calculates according to an RSTD measurement value included in the measurement information reported by the mobile terminal, so as to obtain a measurement position coordinate of the mobile terminal; selects the positioning aid device (the positioning aid device 2 in this embodiment) closest to the measurement position coordinate of the mobile terminal; and performs compensation calculation on the RSTD measurement compensation value corresponding to the positioning aid device.

Alternatively, the positioning server 1 specifically performs matching calculation according to a measurement value in the measurement information reported by the mobile terminal and a measurement reference value in measurement information reported by each positioning aid device, and uses the RSTD measurement compensation value corresponding to the positioning aid device 2 with the calculation result satisfying a matching condition to compensate the RSTD measurement value reported by the mobile terminal.

The positioning server 1, when performing the matching calculation according to the measurement value in the measurement information reported by the mobile terminal and the measurement reference value in the measurement information reported by the positioning aid device to determine the corresponding positioning aid device, may perform calculation by using the following matching algorithm.

The matching calculation and matching condition calculation may be performed by using the following formulas:

$$\Delta TA = (TA'_E - TA'_{UE}) < Threshold\_TA; \quad \text{Formula I:}$$

where $\Delta TA$ is a time advance difference to be calculated, $TA'_{UE}$ is a time advance measured by the mobile terminal, $TA'_E$ is a time advance measured by the positioning aid device, and Threshold_TA is a preset time advance differential threshold value, and the time advance is directly obtained by the mobile terminal and the positioning aid device according to a time parameter between uplink and downlink signals thereof;

$$\Delta RSRP = (RSRP'_E - RSRP'_{UE}) < Threshold\_RSRP; \quad \text{Formula II:}$$

where $\Delta RSRP$ is a reference signal receiving power difference to be calculated, $RSRP'_{UE}$ is a reference signal receiving power value measured by the mobile terminal, $RSRP'_E$ is a reference signal receiving power value measured by the positioning aid device, and Threshold_RSRP is a preset reference signal receiving power differential threshold value;

$$\Delta RSRQ = (RSRQ'_E - RSRQ'_{UE}) < Threshold\_RSRP; \quad \text{Formula III:}$$

where $\Delta RSRQ$ is a reference signal receiving quality difference to be calculated, $RSRQ'_{UE}$ is a reference signal receiving quality value measured by the mobile terminal, $RSRQ'_E$ is a reference signal receiving quality value measured by the positioning aid device, and Threshold_RSRP is a preset reference signal receiving quality difference threshold; and $$\Delta RSTD_i = (RSTD_{iE} - RSTD_{iUE}) < Threshold\_RSTD; \quad \text{Formula IV:}$$

where the $\Delta RSTD_i$ is a difference between the reference signal time difference values of the $i^{th}$ positioning-involved base station as compared with a serving cell base station, $RSTD_{iUE}$ is a reference signal time difference value, measured by the mobile terminal, of the $i^{th}$ positioning-involved base station as compared with the serving cell base station, $RSTD_{iE}$ is a reference signal time difference value, measured by the positioning aid device, of the $i^{th}$ positioning-involved base station as compared with the serving cell base station, and Threshold_RSTD is a preset differential threshold value of the reference signal time difference value.

$TA'_E$, $RSRP'_E$, $RSRQ'_E$, and $RSTD_{iE}$ are corresponding measurement reference values of the positioning aid device. After the above four formulas are calculated, the corresponding positioning aid device with the measurement reference value satisfying one or more of the above conditions is taken as the positioning aid device configured to perform the RSTD measurement compensation.

The above matching calculation and matching condition calculation may also be performed by the following formula:

$$\operatorname{argmin} T = w_1 * [TA'_E - TA'_{UE}]^2 + w_2 * [RSRP'_E - RSRP'_{UE}]^2 + w_3 * [RSRQ'_E - RSRQ'_{UE}]^2 + w_4 * \sum_i [RSTD'_{iE} - RSTD'_{iUE}]^2$$

where $w_1$, $w_2$, $w_3$, and $w_4$ are preset weight values, and the formula represents: For a cost function of the TA value, RSRP value, RSRQ value, and RSTD value of the mobile terminal and each candidate positioning aid device, a corresponding measurement value of the mobile terminal remains unchanged, and after a corresponding measurement reference value of each candidate positioning aid device is substituted in the above calculation formula, the positioning aid device corresponding to the measurement reference value with the minimum result thereof is obtained.

It should be noted here that, the above two types of measurement value matching calculation are merely two examples in this embodiment, and in other embodiments, the measurement value matching calculation may be performed with other measurement values, which is not repeated in detail herein.

A serving cell base station of the positioning aid device obtained by the positioning server 1 by selecting in the above manner and the serving cell base station of the mobile terminal are the same base station; and a positioning-involved base station that is involved in the positioning of the positioning aid device and is corresponding to the selected RSTD measurement compensation value is one-to-one corresponding to a positioning-involved base station corresponding to the RSTD measurement value reported by the mobile terminal.

After obtaining by calculation the position coordinate of the mobile terminal, the positioning server 1 further needs to verify the position of the mobile terminal. The positioning server 1 specifically determines whether the position coordinate of the mobile terminal is positioned in the range corresponding to the position coordinate of the positioning aid device; and if the position coordinate of the mobile terminal is positioned in the range corresponding to the position coordinate of the positioning aid device, feeds the position coordinate obtained by calculation back to the mobile terminal. Otherwise, the position coordinate obtained by this calculation is discarded, and the positioning server 1 executes next compensation on the RSTD measurement value of the mobile terminal and calculates the position coordinate thereof. The above determining process can further enhance the accuracy of the position coordinate of the mobile terminal that is fed back to the mobile terminal during positioning, and reduce the ratio of feeding an incorrect coordinate back to the mobile terminal. Certainly, it is also feasible to directly calculate the position coordinate of the mobile terminal based on the compensation result and feed back to the mobile terminal without performing the determination.

It can be known from the descriptions of the above embodiment, the present invention has the following beneficial effects.

Based on the above, in the embodiment of the present invention, an aid device is added in the fixed position to acquire the RSTD measurement compensation value, and when the mobile terminal needs to be positioned, the positioning server may use an RSTD measurement compensation value of a corresponding aid device to compensate the RSTD measurement value reported by the mobile terminal without requiring the mobile terminal to report additional information such as GPS information. In this way, the positioning precision of the mobile terminal can be prominently improved without increasing the mobile terminal resource overhead.

Figure 6:
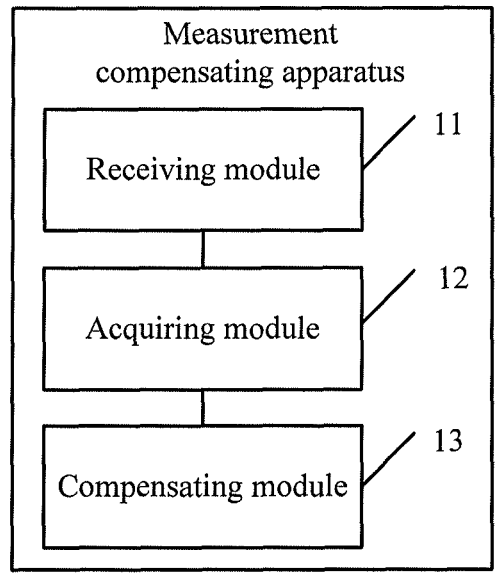
FIG. 6 is a schematic diagram of a measurement compensation apparatus in base station positioning according to an embodiment of the present invention.

FIG. 6 is a schematic diagram of a measurement compensation apparatus in base station positioning according to an embodiment of the present invention, where the measurement compensation apparatus in this embodiment may be set in the positioning server, and specifically, the apparatus includes:

a receiving module 11, configured to receive an RSTD measurement value between different base stations that is reported by a mobile terminal;

an acquiring module 12, configured to acquire an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range;

a compensating module 13, configured to compensate, according to the RSTD measurement compensation value acquired by the acquiring module 12, the RSTD measurement value received by the receiving module 11 to obtain an RSTD compensation result.

When the mobile terminal needs to implement base station positioning, PRSs/CRSs sent by a serving cell base station where the mobile terminal resides and one or more positioning-involved base stations are received, the mobile terminal respectively calculates the time of arrival of the PRS/CRS delivered by the serving cell base station and each positioning-involved base station, respectively calculates a difference of the time of arrival of the PRSs/CRSs between each positioning-involved base station and the serving cell base station to obtain an RSTD measurement value between each positioning-involved base station and the serving cell base station, and reports the obtained RSTD measurement value.

During specific implementation, the mobile terminal may further obtain according to the PRS/CRS: a measurement value of the TOA of the PRS/CRS of the serving cell base station and the positioning-involved base station, an RSRP measurement value, an RSRQ measurement value, and a TA measurement value of the mobile terminal.

A serving cell base station of the positioning aid device corresponding to the RSTD measurement compensation value acquired by the acquiring module 12 and the serving cell base station of the mobile terminal are the same base station; and a positioning-involved base station that is involved the positioning of the positioning aid device and is corresponding to a selected RSTD measurement compensation value is one-to-one corresponding to a positioning-involved base station corresponding to the RSTD measurement value reported by the mobile terminal.

When the compensating module 13 is performing compensation, a simple compensation manner is: adding the RSTD measurement value reported by the mobile terminal with the compensation value: $RSTD'_i + \Delta t_i$, so as to obtain an accurate RSTD value of the mobile terminal, where $RSTD'_i$ is an RSTD measurement value, reported by the mobile terminal, between the $i^{th}$ positioning-involved base station and the serving cell base station where the mobile terminal is positioned, and $\Delta t_i$ is an RSTD measurement compensation value between the $i^{th}$ positioning-involved base station of the mobile terminal corresponding to the selected positioning aid device and a serving cell base station where the positioning aid device is positioned.

Figure 7A:
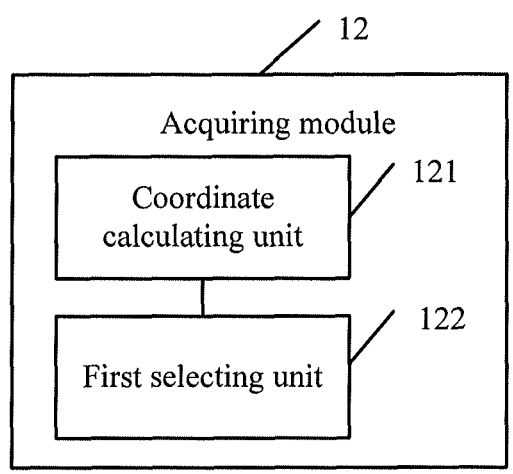
FIG. 7a is a schematic structural diagram of an acquiring module in the measurement compensation apparatus in base station positioning in FIG. 6.

Further, optionally, FIG. 7a is a schematic structural diagram of an acquiring module in the measurement compensation apparatus in base station positioning in FIG. 6, where the acquiring module 12, when selecting the RSTD compensation value, specifically includes the following units:

a coordinate calculating unit 121, configured to perform calculation on the RSTD measurement value reported by the mobile terminal to obtain a measurement position coordinate of the mobile terminal;

a first selecting unit 122, configured to select the positioning aid device closest to the measurement position coordinate of the mobile terminal from a plurality of candidate positioning aid devices according to the measurement position coordinate of the mobile terminal that is calculated by the coordinate calculating unit 121.

The coordinate calculating unit 121 may perform calculation on the RSTD measurement value by using a Taylor algorithm, so as to obtain a coarse position of the mobile terminal.

The first selecting unit 122 selects the RSTD measurement compensation value corresponding to the positioning aid device closest to the mobile terminal. The positioning aid device is pre-deployed in the fixed position to acquire the RSTD measurement compensation value within the range corresponding to the fixed position.

Figure 7B:
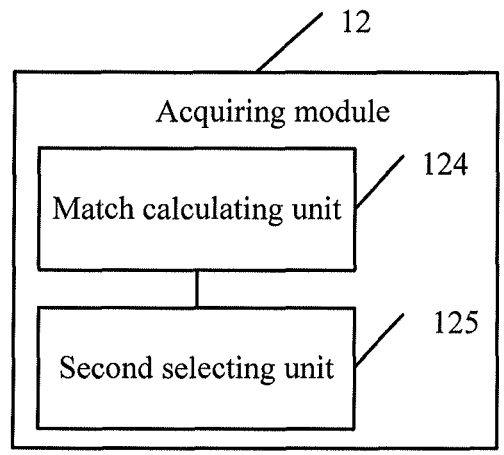
FIG. 7b is a schematic structural diagram of another acquiring module in the measurement compensation apparatus in base station positioning in FIG. 6.

Further, optionally, FIG. 7b is a schematic structural diagram of another acquiring module in the measurement compensation apparatus in base station position in FIG. 6, where the acquiring module 12, when selecting the RSTD compensation value, specifically includes the following units:

a match calculating unit 124, configured to respectively perform matching calculation on the RSTD measurement value and each candidate RSTD measurement value between the different base stations that is reported by each of a plurality of candidate positioning aid devices to obtain a plurality of calculation results; and a second selecting unit 125, configured to select the positioning aid device with the calculation result satisfying a matching condition.

The matching calculation and matching condition calculation of the match calculating unit 124 may be performed by using the following formulas:

Formula I: $\Delta TA=(TA'_E-TA'_{UE})<Threshold\_TA$; where $\Delta TA$ is a time advance difference to be calculated, $TA'_{UE}$ is a time advance measured by the mobile terminal, $TA'_E$ is a time advance measured by the positioning aid device, and Threshold_TA is a preset time advance differential threshold value, and the time advance is directly obtained by the mobile terminal and the positioning aid device according to a time parameter between uplink and downlink signals thereof;

Formula II: $\Delta RSRP=(RSRP'_E-RSRP'_{UE})<Threshold\_RSRP$; where $\Delta RSRP$ is a reference signal receiving power difference to be calculated, $RSRP'_{UE}$ is a reference signal receiving power value measured by the mobile terminal, $RSRP'_E$ is a reference signal receiving power value measured by the positioning aid device, and Threshold_RSRP is a preset reference signal receiving power differential threshold value;

Formula III: $\Delta RSRQ=(RSRQ'_E-RSRQ'_{UE})<Threshold\_RSRP$; where $\Delta RSRQ$ is a reference signal receiving quality difference to be calculated, $RSRQ'_{UE}$ is a reference signal receiving quality value measured by the mobile terminal, $RSRQ'_E$ is a reference signal receiving quality value measured by the positioning aid device, and Threshold_RSRP is a preset reference signal receiving quality difference threshold; and Formula IV: $\Delta RSTD_i=(RSTD_{iE}-RSTD_{iUE})<Threshold\_RSTD$; where the $\Delta RSTD_i$ is a difference between the reference signal time difference values of the $i^{th}$ positioning-involved base station as compared with a serving cell base station, $RSTD_{iE}$ is a reference signal time difference value, measured by the mobile terminal, of the $i^{th}$ positioning-involved base station as compared with the serving cell base station, $RSTD_{iE}$ is a reference signal time difference value, measured by the positioning aid device, of the $i^{th}$ positioning-involved base station as compared with the serving cell base station, and Threshold_RSTD is a preset differential threshold value of the reference signal time difference value.

$TA'_E$, $RSRP'_E$, $RSRQ'_E$, and $RSTD_{iE}$ are corresponding measurement reference values of the positioning aid device. After the above four formulas are calculated, the corresponding positioning aid device with the measurement reference value satisfying one or more of the above conditions is taken as the positioning aid device configured to perform the RSTD compensation.

The above matching calculation and matching condition calculation of the match calculating unit 124 may also be performed by the following formula:

$$\text{argmin} T = w_1 * [TA'_E - TA'_{UE}]^2 + w_2 * [RSRP'_E - RSRP'_{UE}]^2 + w_3 * [RSRQ'_E - RSRQ'_{UE}]^2 + w_4 * \sum_i [RSTD'_{iE} - RSTD'_{iUE}]^2$$

where $w_1$, $w_2$, $w_3$, and $w_4$ are preset weight values, and the formula represents: For a cost function of the TA value, RSRP value, RSRQ value, and RSTD value of the mobile terminal and each candidate positioning aid device, a corresponding measurement value of the mobile terminal remains unchanged, and after a corresponding measurement reference value of each candidate positioning aid device is substituted in the above calculation formula, the positioning aid device corresponding to the measurement reference value that obtains the minimum result thereof is taken as the positioning aid device configured to perform RSTD measurement compensation.

It should be noted here that, the above two types of measurement value matching calculation are merely two examples in this embodiment, and in other embodiments, the measurement value matching calculation may be performed with other measurement values, which is not repeated in detail herein.

The measurement compensation apparatus in base station positioning in this embodiment may manage the positioning aid device and the RSTD measurement compensation value thereof by means of a mapping table, so as to acquire the corresponding RSTD measurement compensation value when determining the positioning aid device configured to perform the RSTD measurement compensation.

Further, another measurement compensation apparatus in base station positioning according to an embodiment of the present invention includes the receiving module 11, the acquiring module 12, and the compensating module 13 in the measurement compensation apparatus in base station positioning shown in FIG. 6, and furthermore, in the embodiment of the present invention, the receiving module 11 is further configured to receive an auxiliary RSTD measurement value between the different base stations that is reported by the positioning aid device; and the acquiring module 12 is specifically configured to calculate an RSTD standard value between the different base stations of the positioning aid device, and take a difference between the auxiliary RSTD measurement value and the RSTD standard value as the RSTD measurement compensation value.

The acquiring module 12 calculates a position coordinate of the positioning aid device, a position coordinate of the serving cell base station, and a position coordinate of the positioning-involved base station, so as to obtain the reference signal time difference RSTD standard value of the positioning aid device between the serving cell base station and the positioning-involved base station; and calculates the reference signal time difference RSTD measurement reference value and the reference signal time difference RSTD standard value, so as to obtain the reference signal time difference RSTD measurement compensation value of the positioning aid device between the serving cell base station and the positioning-involved base station.

The set positioning aid device can complete the residing in the serving cell, and receive the CRS/PRS of a serving cell base station thereof and the positioning-involved base station, so as to complete relevant CRS/PRS measurement.

The positioning aid device may periodically measure the time of arrival of each CRS/PRS, so as to obtain the RSTD measurement reference value, and report the RSTD measurement reference value upon completion of a measurement period.

The position coordinate of the positioning aid device is known, and the position coordinate of the serving cell base station and the position coordinate of the positioning-involved base station may also be obtained directly.

Specifically, the acquiring module 12 may calculate to obtain the RSTD standard value according to the following formula:

$$\text{Standard value RSTD}_i = (\sqrt{(x-x_i)^2+(y-y_i)^2} - \sqrt{(x-x_0)^2+(y-y_0)^2})/c$$

where $(x_0, y_0)$ is the position coordinate of the serving cell base station, $(x, y)$ is the position coordinate of the positioning aid device, $(x_i, y_i)$ is a position coordinate of the $i^{th}$ positioning-involved base station, and c is speed of light.

After obtaining by calculation the RSTD standard value, the acquiring module 12, according to the RSTD measurement reference value reported by the positioning aid device and received by the receiving module 11, may calculate to obtain the RSTD compensation value $\Delta t_i$ between the serving cell base station and the $i^{th}$ positioning-involved base station in a region corresponding to the position where the positioning aid device is positioned, and the specific formula is: $\Delta t_i = \text{RSTD}_i - \text{RSTD}'_i$, where $\text{RSTD}_i$ is the standard value obtained by the above calculation, and $\text{RSTD}'_i$ is the acquired measurement reference value.

It can be known from the descriptions of the above embodiment, the present invention has the following beneficial effects.

In the embodiment of the present invention, an aid device is added in the fixed position to acquire the RSTD measurement compensation value, and when some mobile terminals need to be positioned, the positioning server can compensate, according to the acquired RSTD measurement compensation value, the RSTD measurement value in measurement information reported by the mobile terminal, thereby prominently improving the positioning precision of the mobile terminal.

Figure 8:
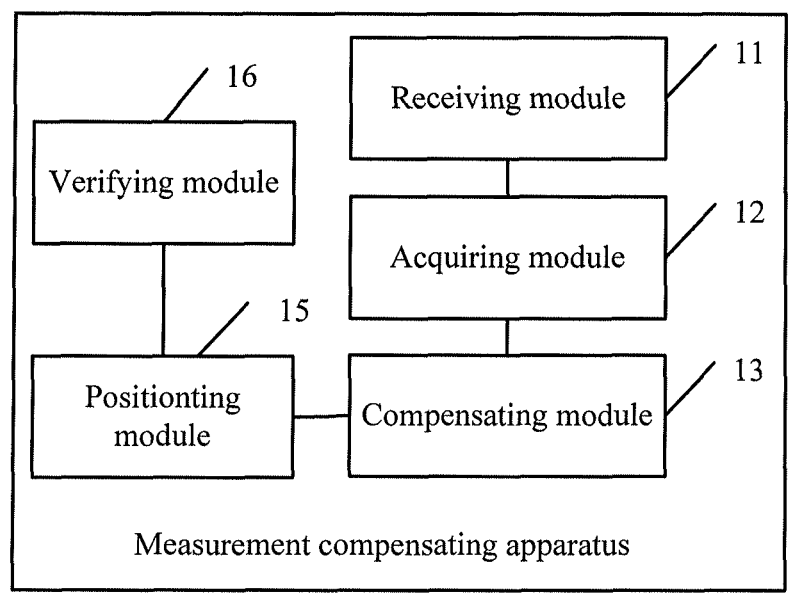
FIG. 8 is a schematic structural diagram of another measurement compensation apparatus in base station positioning according to an embodiment of the present invention.

Further, FIG. 8 is a schematic structural diagram of another measurement compensation apparatus in base station positioning according to an embodiment of the present invention. The apparatus in this embodiment includes the receiving module 11, the acquiring module 12, and the compensating module 13 in the measurement compensation apparatus in base station positioning shown in the above FIG. 6. For the acquiring module 12, reference may be made to FIGS. 7a and/or 7b. In the embodiment of the present invention, the apparatus further includes a positioning module 15 and a verifying module 16.

The positioning module 15 is configured to calculate a position coordinate of the mobile terminal according to the RSTD compensation result.

The verifying module 16 is configured to determine whether the position coordinate of the mobile terminal that is calculated by the positioning module is positioned in the range, and if the position coordinate of the mobile terminal that is calculated by the positioning module is positioned in the range, feed the position coordinate of the mobile terminal back to the mobile terminal.

The position coordinate of the mobile terminal is obtained, and the position coordinate of the mobile terminal is compared with the selected positioning aid device. If the position coordinate is within the range covered by the positioning aid device, the position coordinate of the mobile terminal in this calculation is correct, and the position coordinate of the mobile terminal is fed back to the mobile terminal; otherwise, the calculation is incorrect, and the position coordinate obtained by this calculation is discarded. Next compensation on the RSTD measurement value of the mobile terminal is further executed and the position coordinate thereof is calculated. The range covered by the positioning aid device may be determined according to a specific precision requirement. The smaller the range covered by each positioning aid device is, the more accurate the obtained RSTD compensation value becomes, and finally a more accurate position coordinate of the mobile terminal is obtained.

It can be known from the descriptions of the above embodiment, the present invention has the following beneficial effects.

Based on the above, in the embodiment of the present invention, an aid device is added in the fixed position to acquire the RSTD measurement compensation value, and when the mobile terminal needs to be positioned, the positioning server may use the RSTD measurement compensation value of the corresponding aid device to compensate the RSTD measurement value reported by the mobile terminal without requiring the mobile terminal to report additional information such as GPS information. In this way, the positioning precision of the mobile terminal can be prominently improved without increasing the mobile terminal resource overhead.

Furthermore, after the position coordinate of the mobile terminal is obtained by calculation, the position coordinate of the mobile terminal is further verified according to the position of the selected positioning aid device configured to perform the RSTD measurement compensation, thereby further ensuring the positioning accuracy of the mobile terminal.

Figure 9:
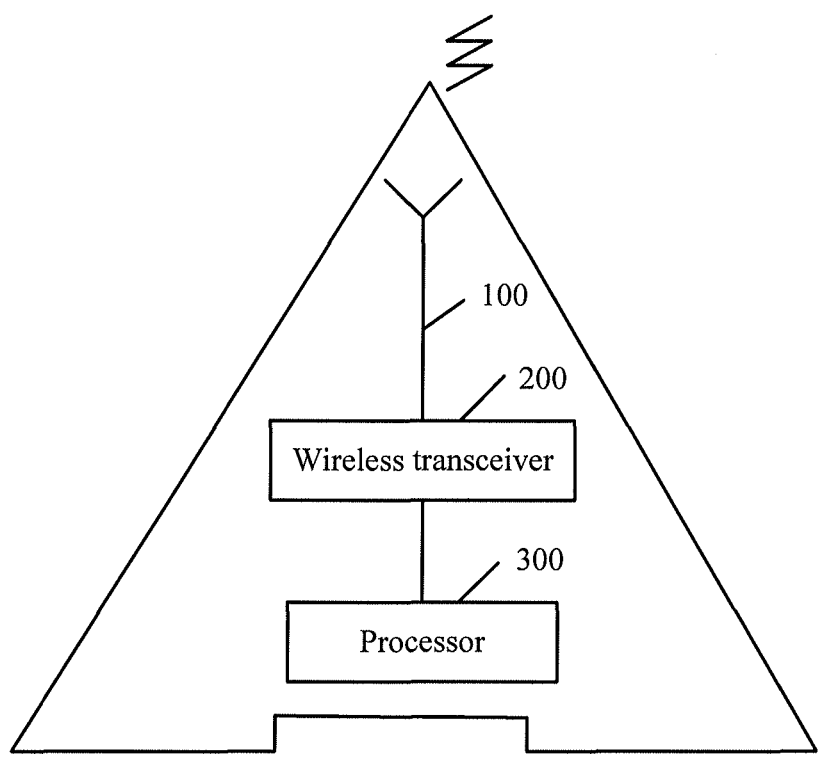
FIG. 9 is a schematic structural and composition diagram of a positioning server according to an embodiment of the present invention.

Further, FIG. 9 is a schematic structural and composition diagram of a positioning server according to an embodiment of the present invention. In this embodiment, the positioning server includes:

a wireless transceiver (Transceiver) 200, configured to receive, through an antenna 100, an RSTD measurement value between different base stations that is reported by a mobile terminal; and a processor (Processor) 300, configured to: acquire an RSTD measurement compensation value corresponding to a positioning aid device, where the positioning aid device is pre-deployed in a fixed position, the mobile terminal is positioned in a range corresponding to the fixed position, and the RSTD measurement compensation value is used to compensate RSTD measurement within the range; and compensate the RSTD measurement value according to the RSTD measurement compensation value to obtain an RSTD compensation result.

When the mobile terminal needs to implement base station positioning, PRSs/CRSs sent by a serving cell base station where the mobile terminal resides and one or more positioning-involved base stations are received, the mobile terminal respectively calculates the time of arrival of the PRS/CRS delivered by the serving cell base station and each positioning-involved base station, calculates a difference of the time of arrival of the PRSs/CRSs between each positioning-involved base station and the serving cell base station to obtain an RSTD measurement value between each positioning-involved base station and the serving cell base station, and reports the obtained RSTD measurement value to a positioning server 1.

The positioning aid device is pre-deployed in the fixed position and reports an auxiliary RSTD measurement value between the different base stations to the positioning server. The positioning aid device can complete the residing in the serving cell, and receive the CRS/PRS of a serving cell base station thereof and the positioning-involved base station, so as to complete relevant CRS/PRS measurement.

The positioning aid device may periodically measure the time of arrival of each CRS/PRS, so as to obtain the RSTD measurement reference value, and report the measurement reference value to the positioning server upon completion of a measurement period.

The processor 300, according to the RSTD measurement reference value reported by the positioning aid device and a position coordinate of the positioning aid device, calculates to obtain the RSTD measurement compensation value corresponding to the positioning aid device. Moreover, the compensation value is adopted to compensate the RSTD measurement of the mobile terminal.

The processor 300 selects the positioning aid device in the following manner.

The processor 300 performs calculation on the RSTD measurement value to obtain a measurement position coordinate of the mobile terminal, and selects the positioning aid device closest to the measurement position coordinate of the mobile terminal from a plurality of candidate positioning aid devices. The processor 300 selects the RSTD measurement compensation value corresponding to the positioning aid device closest to the mobile terminal. The selecting the positioning aid device specifically includes: performing calculation on the RSTD measurement value to obtain the measurement position coordinate of the mobile terminal, and selecting the positioning aid device closest to the measurement position coordinate of the mobile terminal from the plurality of candidate positioning aid devices.

Alternatively, the processor 300 respectively performs matching calculation on the RSTD measurement value with each candidate RSTD measurement value between the different base stations that is reported by each of a plurality of candidate positioning aid devices to obtain a plurality of calculation results, and selects the positioning aid device with the calculation result satisfying a matching condition. The processor 300 may select the positioning aid device in a manner of signal matching. The selecting the positioning aid device specifically includes: respectively performing the matching calculation on the RSTD measurement value and each candidate RSTD measurement value between the different base stations that is reported by each of the plurality of candidate positioning aid devices to obtain the plurality of calculation results, and selecting the positioning aid device with the calculation result satisfying the matching condition.

The wireless transceiver 200 is further configured to receive the auxiliary RSTD measurement value between the different base stations that is reported by the positioning aid device.

The processor 300 is further configured to calculate an RSTD standard value between the different base stations of the positioning aid device, and take a difference between the auxiliary RSTD measurement value and the RSTD standard value as the RSTD measurement compensation value.

The processor 300 is further configured to calculate a position coordinate of the mobile terminal based on the RSTD compensation result, determine whether the position coordinate of the mobile terminal is positioned in the range, and when determining that the position coordinate of the mobile terminal is positioned in the range, feed the position coordinate of the mobile terminal back to the mobile terminal.

The processor 300 obtains the position coordinate of the mobile terminal, and compares the position coordinate of the mobile terminal with the position of the positioning aid device. When it is determined that the position coordinate of the mobile terminal is positioned within the range, the position coordinate of the mobile terminal in this calculation is correct; and the processor 300 feeds the position coordinate of the mobile terminal that is obtained by calculation back to the mobile terminal through the transceiver 200; otherwise, performs a next positioning calculation. The range covered by the positioning aid device may be determined according to a specific precision requirement. The smaller the range covered by each positioning aid device is, the more accurate the obtained RSTD compensation value becomes, and finally a more accurate position coordinate of the mobile terminal is obtained.

Based on the above, in the embodiment of the present invention, an aid device is added in the fixed position to acquire the RSTD measurement compensation value, and when the mobile terminal needs to be positioned, the positioning server may use an RSTD measurement compensation value of a corresponding aid device to compensate the RSTD measurement value reported by the mobile terminal without requiring the mobile terminal to report additional information such as GPS information. In this way, the positioning precision of the mobile terminal can be prominently improved without increasing the mobile terminal resource overhead.

FIG. 9 illustrates merely an example. Certainly, the function of the wireless transceiver 200 may also be replaced with a wired interface, and the wired interface may be configured to communicate with the base station, so as to receive the RSTD measurement value between the different base stations that is reported by the mobile terminal and sent by the base station. When the mobile terminal reports an RSTD measurement value between two base stations, the base station sending the RSTD measurement value to the positioning server may be one of the two base stations. The mobile terminal may firstly report the RSTD measurement value to one base station, and the RSTD measurement value is forwarded by the base station to the positioning server through a wired connection or a third-party device. The wired connection can be implemented through an optical fiber. Because the positioning server may acquire the RSTD measurement value between the different base stations that is reported by the mobile terminal in a wired or wireless manner, an entity for receiving the RSTD measurement value may be uniformly referred to as a transceiver, for example the wireless transceiver 200 in FIG. 9 or the wired interface. This embodiment merely uses the positioning server including the wireless transceiver 200 as an example for illustration, and is not intended for limitation.

Persons of ordinary skill in the art may understand that all or partial procedures in the method in the above embodiments maybe implemented by a computer program instructing relevant hardware. The program may be stored in a computer readable storage medium. When the program is run, the procedures of the methods in the above embodiments are performed. The storage medium may be a magnetic disk, an optical disk, a read-only memory (Read-Only Memory, ROM), a random access memory (Random Access Memory, RAM), or the like.

The foregoing disclosures are merely exemplary embodiments of the present invention, but are not intended to limit the protection scope of rights of the present invention. Therefore, any equivalent change made according to the claims of the present invention still falls within the scope of the present invention. The embodiments of the present invention may be mutually combined in the case of no conflict with each other. For example, reference may be made to the foregoing method embodiments for the specific functions implemented by the above device, apparatus, and system as well as the unit entities therein.

What is claimed is:
1. A measurement compensation method for base station positioning, comprising:

receiving, by a positioning server, a reference signal time difference RSTD measurement value between different base stations that is reported by a mobile terminal;

acquiring, by the positioning server, an RSTD measurement compensation value corresponding to a positioning aid device that has a coverage range, wherein the positioning aid device is pre-deployed in a fixed position, the mobile terminal is positioned in a range covered by the positioning aid device corresponding to the fixed position, the RSTD measurement compensation value is used to compensate RSTD measurement within the range, and accuracy of the RSTD measurement compensation value depends on a size of the range covered by the positioning aid device; and compensating, by the positioning server, the RSTD measurement value according to the RSTD measurement compensation value to obtain an RSTD compensation result.

2. The method according to claim 1, wherein before acquiring, by the positioning server, the RSTD measurement compensation value corresponding to the positioning aid device, the method further comprises:

performing, by the positioning server, calculation on the RSTD measurement value to obtain a measurement position coordinate of the mobile terminal; and selecting, by the positioning server, the positioning aid device closest to the measurement position coordinate of the mobile terminal from a plurality of candidate positioning aid devices.

3. The method according to claim 1, wherein before acquiring, by the positioning server, the RSTD measurement compensation value corresponding to the positioning aid device, the method further comprises:

respectively performing, by the positioning server, matching calculation on the RSTD measurement value and each candidate RSTD measurement value between the different base stations that is reported by each of a plurality of candidate positioning aid devices to obtain a plurality of calculation results, and selecting, by the positioning server, the positioning aid device with the calculation result satisfying a matching condition.

4. The method according to claim 1, wherein the acquiring, by the positioning server, the RSTD measurement compensation value corresponding to the positioning aid device comprises:

receiving, by the positioning server, an auxiliary RSTD measurement value between the different base stations that is reported by the positioning aid device;

calculating, by the positioning server, an RSTD standard value between the different base stations of the positioning aid device; and taking, by the positioning server, a difference between the auxiliary RSTD measurement value and the RSTD standard value as the RSTD measurement compensation value.

5. The method according to claim 1, wherein after the compensating, by the positioning server, the RSTD measurement value to obtain the RSTD compensation result, the method further comprises:

calculating, by the positioning server, a position coordinate of the mobile terminal based on the RSTD compensation result;

determining, by the positioning server, whether the position coordinate of the mobile terminal is positioned within the range; and when determining that the position coordinate of the mobile terminal is positioned in the range, feeding, by the positioning server, the position coordinate of the mobile terminal back to the mobile terminal.

6. A measurement compensation apparatus in a positioning server for base station positioning, comprising:

a receiving module, configured to receive an RSTD measurement value between different base stations that is reported by a mobile terminal;

an acquiring module, configured to acquire an RSTD measurement compensation value corresponding to a positioning aid device that has a coverage range, wherein the positioning aid device is pre-deployed in a fixed position, the mobile terminal is positioned in a range covered by the positioning aid device corresponding to the fixed position, the RSTD measurement compensation value is used to compensate RSTD measurement within the range, and accuracy of the RSTD measurement compensation value depends on a size of the range covered by the positioning aid device; and a compensating module, configured to compensate, according to the RSTD measurement compensation value acquired by the acquiring module, the RSTD measurement value received by the receiving module to obtain an RSTD compensation result.

7. The apparatus according to claim 6, wherein the acquiring module comprises:

a coordinate calculating unit, configured to perform calculation on the RSTD measurement value to obtain a measurement position coordinate of the mobile terminal; and a first selecting unit, configured to select the positioning aid device closest to the measurement position coordinate of the mobile terminal from a plurality of candidate positioning aid devices according to the measurement position coordinate of the mobile terminal that is calculated by the coordinate calculating unit.

8. The apparatus according to claim 6, wherein the acquiring module comprises:

a match calculating unit, configured to respectively perform matching calculation on the RSTD measurement value and each candidate RSTD measurement value between the different base stations that is reported by each of a plurality of candidate positioning aid devices to obtain a plurality of calculation results; and a second selecting unit, configured to select the positioning aid device with the calculation result satisfying a matching condition.

9. The apparatus according to claim 6, wherein the receiving module is further configured to receive an auxiliary RSTD measurement value between the different base stations that is reported by the positioning aid device; and the acquiring module is specifically configured to calculate an RSTD standard value between the different base stations of the positioning aid device, and take a difference between the auxiliary RSTD measurement value and the RSTD standard value as the RSTD measurement compensation value.

10. The apparatus according to claim 6, further comprising:

a positioning module, configured to calculate a position coordinate of the mobile terminal according to the RSTD compensation result; and a verifying module, configured to determine whether the position coordinate of the mobile terminal that is calculated by the positioning module is positioned within the range, and if the position coordinate of the mobile terminal that is calculated by the positioning module is positioned within the range, feed the position coordinate of the mobile terminal back to the mobile terminal.

11. A positioning server, comprising:
a transceiver, configured to receive an RSTD measurement value between different base stations that is reported by a mobile terminal; and
a processor, configured to: acquire an RSTD measurement compensation value corresponding to a positioning aid device that has a coverage range, wherein the positioning aid device is pre-deployed in a fixed position, the mobile terminal is positioned in a range covered by the positioning aid device corresponding to the fixed position, the RSTD measurement compensation value is used to compensate RSTD measurement within the range, and accuracy of the RSTD measurement compensation value depends on a size of the range covered by the positioning aid device; and compensate the RSTD measurement value according to the RSTD measurement compensation value to obtain an RSTD compensation result.

12. The positioning server according to claim 11, wherein the processor is further configured to perform calculation on the RSTD measurement value to obtain a measurement position coordinate of the mobile terminal, and select the positioning aid device closest to the measurement position coordinate of the mobile terminal from a plurality of candidate positioning aid devices.

13. The positioning server according to claim 11, wherein the processor is further configured to respectively perform matching calculation on the RSTD measurement value and each candidate RSTD measurement value between the different base stations that is reported by each of a plurality of candidate positioning aid devices to obtain a plurality of calculation results, and select the positioning aid device with the calculation result satisfying a matching condition.

14. The positioning server according to claim 11, wherein the transceiver is further configured to receive an auxiliary RSTD measurement value between the different base stations that is reported by the positioning aid device; and the processor is further configured to calculate an RSTD standard value between the different base stations of the positioning aid device, and take a difference between the auxiliary RSTD measurement value and the RSTD standard value as the RSTD measurement compensation value.

15. The positioning server according to claim 11, wherein the processor is further configured to calculate a position coordinate of the mobile terminal based on the RSTD compensation result, determine whether the position coordinate of the mobile terminal is positioned within the range, and when determining that the position coordinate of the mobile terminal is positioned within the range, feed the position coordinate of the mobile terminal back to the mobile terminal.

16. A base station positioning system, comprising: a positioning server and a positioning aid device that has a coverage range; wherein
the positioning aid device is pre-deployed in a fixed position, and is configured to report an auxiliary RSTD measurement value between different base stations; and
the positioning server is configured to:
receive an RSTD measurement value between the different base stations that is reported by a mobile terminal, wherein the mobile terminal is positioned in a range covered by the positioning aid device corresponding to the fixed position;
calculate a difference between the auxiliary RSTD measurement value and an RSTD standard value between the different base stations of the positioning aid device, and take the difference as an RSTD measurement compensation value corresponding to the positioning aid device, wherein the RSTD measurement compensation value is used to compensate RSTD measurement within the range, and accuracy of the RSTD measurement compensation value depends on a size of the range covered by the positioning aid device; and
compensate the RSTD measurement value according to the RSTD measurement compensation value to obtain an RSTD compensation result.

* * * * *